(12) United States Patent  
Li (10) Patent No.: US 11,579,448 B2
(45) Date of Patent: Feb. 14, 2023

(54) METHOD AND DEVICE FOR REFRACTION ADJUSTMENT, AND AUGMENTED REALITY APPARATUS

(71) Applicant: BOE TECHNOLOGY GROUP CO., LTD., Beijing (CN)

(72) Inventor: Dianmeng Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 547 days.

(21) Appl. No.: 16/610,559

(22) PCT Filed: Mar. 26, 2019

(86) PCT No.: PCT/CN2019/079618
§ 371 (c)(1),
(2) Date: Nov. 4, 2019

(87) PCT Pub. No.: WO2019/184896
PCT Pub. Date: Oct. 3, 2019

(65) Prior Publication Data
US 2021/0157141 A1    May 27, 2021

(30) Foreign Application Priority Data

Mar. 26, 2018  (CN) .......................... 201810252227.3

(51) Int. Cl.
*G02B 27/01* (2006.01)
*G02F 1/29* (2006.01)
*G02B 27/30* (2006.01)

(52) U.S. Cl.
CPC ..... *G02B 27/0172* (2013.01); *G02B 27/0179* (2013.01); *G02B 27/30* (2013.01);
(Continued)

(58) Field of Classification Search
CPC ............ G02B 27/0172; G02B 27/0179; G02B 27/30; G02B 2027/0123;
(Continued)

(56) References Cited

U.S. PATENT DOCUMENTS 10,520,731 B2 * 12/2019 Amitai ............... G02B 27/0172
10,901,205 B1 *  1/2021 Lu ......................... G02B 27/017
(Continued)

FOREIGN PATENT DOCUMENTS

CN   103309035 A   9/2013
CN   103439801 A   12/2013
(Continued)

OTHER PUBLICATIONS

First Office Action for Chinese Patent Application No. 201810252227.3 dated May 10, 2019.
(Continued)

*Primary Examiner* — Thomas K Pham
*Assistant Examiner* — Henry A Duong
(74) *Attorney, Agent, or Firm* — Calfee, Halter & Griswold LLP (57) ABSTRACT

A method and device for refraction adjustment in an augmented reality apparatus, and an augmented reality apparatus. The method for refraction adjustment includes: receiving light rays reflected from eyes of a user wearing an augmented reality apparatus; determining a pupil distance of the user according to the reflected light rays; and generating a refraction correction signal according to the pupil distance of the user and a desired diopter(s) for correcting diopters of the user's eyes by means of a refraction adjustment element.

15 Claims, 6 Drawing Sheets

(52) U.S. Cl.
CPC ........ *G02F 1/294* (2021.01); *G02B 2027/014* (2013.01); *G02B 2027/0123* (2013.01); *G02B 2027/0138* (2013.01); *G02B 2027/0187* (2013.01)

(58) Field of Classification Search
CPC ...... G02B 2027/0138; G02B 2027/014; G02B 2027/0187; G02B 26/06; G02B 2027/0125; G02B 2027/0132; G02B 2027/0185; G02B 27/0093; G02F 1/294; G02F 1/0018; G02F 1/03; G02F 1/29; G02F 1/292
USPC ........................................................ 359/315
See application file for complete search history.

(56) References Cited

U.S. PATENT DOCUMENTS

| | | |
|---|---|---|
| 2006/0122531 A1 | 6/2006 | Goodall et al. |
| 2013/0242555 A1 | 9/2013 | Mukawa |
| 2015/0138451 A1 | 5/2015 | Amitai |
| 2016/0193104 A1 | 7/2016 | Du |
| 2018/0047369 A1* | 2/2018 | Zhao ...................... G06F 3/011 |
| 2019/0073533 A1* | 3/2019 | Chen .................... G06V 40/193 |

FOREIGN PATENT DOCUMENTS

| | | |
|---|---|---|
| CN | 104395815 A | 3/2015 |
| CN | 105068248 A | 11/2015 |
| CN | 105068249 A | 11/2015 |
| CN | 106293100 A | 1/2017 |
| CN | 106461939 A | 2/2017 |
| CN | 106950694 A | 7/2017 |
| CN | 107291233 A | 10/2017 |
| CN | 206671681 U | 11/2017 |
| CN | 108490611 A | 9/2018 |

OTHER PUBLICATIONS

Second Office Action for Chinese Patent Application No. 201810252227.3 dated Dec. 13, 2019.

Third Office Action for Chinese Patent Application No. 201810252227.3 dated Mar. 26, 2020.

* cited by examiner

METHOD AND DEVICE FOR REFRACTION ADJUSTMENT, AND AUGMENTED REALITY APPARATUS

CROSS REFERENCE TO RELATED APPLICATIONS

The present application is the U.S. national phase entry of PCT/CN2019/079618, with an international filing date of Mar. 26, 2019, which claims the benefit of Chinese Patent Application No. 201810252227.3, filed on Mar. 26, 2018, the entire disclosures of which are incorporated herein by reference.

FIELD

The present disclosure relates to the field of display technology, and more particularly to a method and device for refraction adjustment in an augmented reality apparatus, as well as an augmented reality apparatus.

BACKGROUND

Augmented Reality (AR) is a new technology that merges real-world information and virtual information. It is characterized by applying virtual information to a real environment and merging physical objects in the real environment and the virtual information in the same picture or space to achieve a sensory experience that transcends reality.

SUMMARY

According to a first embodiment of the present disclosure, there is provided a method for refraction adjustment in an augmented reality apparatus, comprising: receiving light rays reflected from eyes of a user wearing the augmented reality apparatus; determining a pupil distance of the user according to the reflected light rays; and generating a refraction correction signal according to the pupil distance of the user and a desired diopter(s) for correcting diopters of the user's eyes by a refraction adjustment element in the augmented reality apparatus.

In certain exemplary embodiments, the step of generating a refraction correction signal according to the pupil distance of the user and a desired diopter(s) for correcting diopters of eyes by the refraction adjustment element comprises: generating a focal length adjustment signal according to the desired diopter(s) so that a focal length of the refraction adjustment element is adjusted to preliminarily correct the diopters of eyes; and generating an optical axis adjustment signal according to the pupil distance of the user so that an optical axis position of the refraction adjustment element is adjusted to secondarily correct the diopters of eyes.

In certain exemplary embodiments, the step of determining a pupil distance of the user according to the reflected light rays comprises: acquiring a left eye image and a right eye image of the user respectively according to the reflected light rays; performing image recognition on the left eye image and the right eye image respectively so as to determine a left is eye pupil position and a right eye pupil position; and determining the pupil distance of the user according to the left eye pupil position and the right eye pupil position.

In certain exemplary embodiments, after correcting the diopters of the user's eyes by the refraction adjustment element, the method further comprises: acquiring a feature image of muscles around eyes; and in response to correction of the diopters of eyes being determined as inappropriate according to the feature image of muscles, generating a refraction adjustment signal for adjusting the diopters of eyes by the refraction adjustment element.

In certain exemplary embodiments, the method further comprises: storing the refraction correction signal generated for the user in correspondence to identity information of the user.

In certain exemplary embodiments, the method further comprises: acquiring iris feature information of eyes according to the reflected light rays; determining the identity information of the user according to the iris feature information of eyes; acquiring a stored corresponding refraction correction signal based on the determined identity information; and correcting the diopters of eyes by the refraction adjustment element according to the acquired corresponding refraction correction signal.

According to a second embodiment of the present disclosure, there is provided a refraction adjustment control device for an augmented reality apparatus, comprising a reflected light receiver, a pupil distance determiner and a refraction correction signal generator. The reflected light receiver is configured to receive light rays reflected from eyes of a user wearing the augmented reality apparatus. The pupil distance determiner is configured to determine a pupil distance of the user according to the reflected light rays. The refraction correction signal generator is configured to generate a refraction correction signal according to the pupil distance and diopters of the user's eyes for correcting diopters of the user's eyes by a refraction adjustment element in the augmented reality apparatus.

According to a third embodiment of the present disclosure, there is provided an augmented reality apparatus, comprising: a refraction adjustment control device as stated above and in other parts of the description and a refraction adjustment element. The refraction adjustment element is at a side close to the user's eyes and configured to correct the diopters of eyes according to the refraction correction signal generated by the refraction adjustment control device.

In certain exemplary embodiments, the augmented reality apparatus further comprises a light source and an optical coupling element. The light source is configured to emit light rays. The optical coupling element is configured to couple the light rays emitted by the light source to the refraction adjustment element before the light rays are incident into a field of view range of the user, and reversely couple the light rays reflected from the user's eyes to the refraction adjustment control device.

In certain exemplary embodiments, the optical coupling element comprises a beam splitting element and an optical waveguide element. The beam splitting element is between the light source and the optical waveguide element. The light rays emitted from the light source are reflected to the optical waveguide element through the beam splitting element, coupled by the optical waveguide element to the refraction adjustment element, and then incident into the field of view range of the user. After passing through the refraction adjustment element, the light rays reflected from the user's eyes are reversely coupled by the optical waveguide element to the beam splitting element. After that, the light rays are reflected by the beam splitting element to the refraction adjustment control device.

In certain exemplary embodiments, the beam splitting element comprises a beam splitting prism and a dichroic mirror. The beam splitting prism is between the light source and the dichroic mirror, and the dichroic mirror is between the beam splitting prism and the optical waveguide element.

The light rays emitted from the light source are incident into the is dichroic mirror through the beam splitting prism and are reflected to the optical waveguide element by the dichroic mirror. The light rays reflected from the user's eyes are reversely coupled to the dichroic mirror through the optical waveguide element, reflected to the beam splitting prism by the dichroic mirror, and then reflected to the refraction adjustment control device by the beam splitting prism.

In certain exemplary embodiments, the augmented reality apparatus further comprises a microdisplay element and a collimating element. The microdisplay element is configured to display an image, and a wavelength of the light rays of the displayed image is different from a wavelength of the light rays emitted by the light source. The collimating element is between the microdisplay element and the dichroic mirror. The dichroic mirror is between the collimating element and the optical waveguide element. The light rays of the displayed image are incident into the optical waveguide element through the dichroic mirror after being collimated by the collimating element, and are coupled to the refraction adjustment element through the optical waveguide element before incident into a field of view range of the user.

It shall be understood that the above general description and the subsequent detailed description are only exemplary and illustrative, and do not limit the present disclosure.

BRIEF DESCRIPTION OF DRAWINGS

The drawings herein are incorporated into the description as a part thereof, which illustrate embodiments that are in line with the present disclosure and are used with the description for explaining the principle of the present disclosure.

DETAILED DESCRIPTION

Exemplary embodiments will be described in detail herein, and examples thereof are illustrated in the drawings. Where the drawings are mentioned in the following description, like numerals in different drawings refers to the same or similar elements unless otherwise specified. The implementations described in the following exemplary embodiments do not represent all implementations that are consistent with the present disclosure. Instead, they are merely examples of devices and methods that are consistent with some embodiments of the disclosure as described in detail in the appending claims.

A current augmented reality apparatus is usually designed for users with normal eyesight and not applicable for users with abnormal eyesight. Thus, when myopic or hyperopic users use such augmented reality apparatuses, they need to wear myopic or hyperopic glasses before wearing the augmented reality apparatuses in order to see clearly an image that is incident into human eyes, which affects comfort in use of an augmented reality apparatus.

Figure 1:
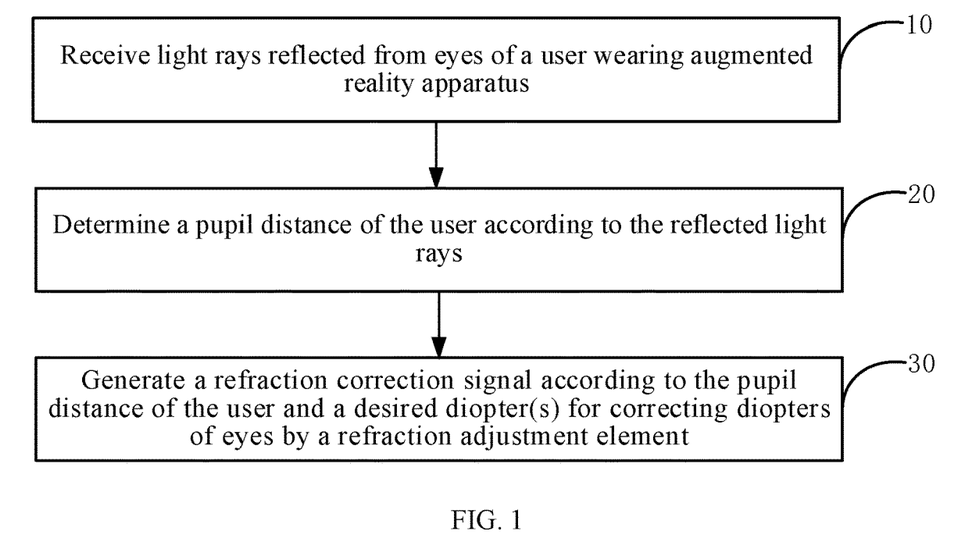
FIG. 1 is a working flowchart of a method for refraction adjustment in an augmented reality apparatus provided by an embodiment of the present disclosure.

To address a problem of uncomfortable wearing of a current augmented reality apparatus, the embodiments of the present disclosure provides a method for refraction adjustment in an augmented reality apparatus. As shown in FIG. 1, the method comprises the steps of:

S10: receiving light rays reflected from eyes of a user wearing an augmented reality apparatus;

S20: determining a pupil distance of the user according to the reflected light rays; and S30: generating a refraction correction signal according to the pupil distance of the user and a desired diopter(s) for correcting diopters of the user's eyes by a refraction adjustment element in the augmented reality apparatus.

After wearing an augmented reality apparatus, a user can observe the light incident into a field of view range of the user's eyes. The light may be from a natural light source or a light source contained in the augmented reality apparatus. The light may be reflected by the eyes. The light rays reflected by two eyes (including the left eye and the right eye) may be received by a camera device or some specialized optical sensors.

By analyzing the light rays reflected by two eyes, positions of pupils of two eyes may be determined, and then the pupil distance of the user may be determined. The pupil distance of the user refers to the distance between iii the left eye pupil and the right eye pupil. The pupil distance of the user may be the distance between the center of the left eye pupil and the center of the right eye pupil, or the distance between an outer edge (near the side of the temple on a human face) of the left eye pupil to an inner edge (near the side of the nose on a human face) of the right eye pupil, or the distance is from the inner edge of the left eye pupil to the outer edge of the right eye pupil.

The effect of refracting light by an eye is called refraction. Refractive capability is represented by optical power, which is called diopter. Diopter is a unit of measurement of the refractive capability, which is represented by D. When an eye has a vision health problem, such as myopia or hyperopia, the eye cannot see a clear image, that is, the diopter of the eye is abnormal.

When the eye is myopic or hyperopic, glasses may be worn. The diopter of an eye itself is corrected by the lens of the glasses, so that the eye can see a clear image.

Refractive capability of a lens of glasses is in general expressed in degree, which degree equals to a value of diopter D multiplied by 100. The myopic lens is a concave lens, and the hyperopic lens is a convex lens. The diopter of the myopic lens is −D, and the diopter of the hyperopic lens is +D. For example, a 200-degree myopic lens has a diopter of −2D, and a 150-degree hyperopic lens has a diopter of +1.5 D. The diopter of the lens is related to the focal length of the lens. The greater the diopter, the smaller the focal length of the lens.

A refraction adjustment element is configured to correct the diopters of eyes, which is equivalent to two lenses in front of two eyes. The lens may be a convex lens or a concave lens. The distance between the center of the left eye lens and the center of the right eye lens (namely, optical center distance) shall match with the pupil distance of the user. Otherwise, even though the diopter of the refraction adjustment element is correct, it will make the user uncomfortable, and affect eyesight thereof.

A desired diopter may refer to a diopter that is required for correcting the diopter of a user's eye to a normal vision when utilizing a refraction adjustment element. The desired diopter may be set according to the user's needs. The desired diopter may be different for different users as diopters of their eyes may be different. In an embodiment, a user may input a is desired diopter value manually or vocally to set the desired diopter in an augmented reality apparatus. Alternatively or additionally, a user may also select a suitable desired diopter from a plurality of desired diopters pre-set in the augmented reality apparatus. Exemplarily, the desired diopter may be selected by means of a button or knob.

Correction of diopters of a user's eyes with the refraction adjustment element is associated with not only the desired diopter(s), but also the pupil distance of the user. Accordingly, in the embodiment, a refraction correction signal is generated according to the pupil distance of the user and the desired diopter(s). The refraction correction signal serving as an input signal for the refraction adjustment element corrects the diopters of eyes through an adjustment effect of the refraction adjustment element. Exemplarily, the refraction adjustment element may adjust a focal length of and a position of an optical axis of "an equivalent lens" thereof according to the refraction correction signal, so that it may function as a myopic lens or a hyperopic lens, and achieve the myopic or hyperopic refraction correction effect for eyes.

It can be seen from the above description that the method for refraction adjustment according to an embodiment of the present disclosure makes reference to not only the desired diopter(s), but also the pupil distance between the two eyes, when correcting the diopters of eyes with the refraction adjustment element. Thus, the diopters may be corrected adaptively according to the diopters of eyes of different users wearing the augmented reality apparatuses, thereby achieving an effect of myopia and hyperopia correction. Meanwhile, a diopter correction effect of eyes is good because personalized requirements of different users for diopter correction can be satisfied. There is no need to wear additional myopic or hyperopic glasses when the augmented reality apparatus applies the method for refraction adjustment, thereby enhancing the comfort in use of augmented reality apparatuses.

Figure 2:
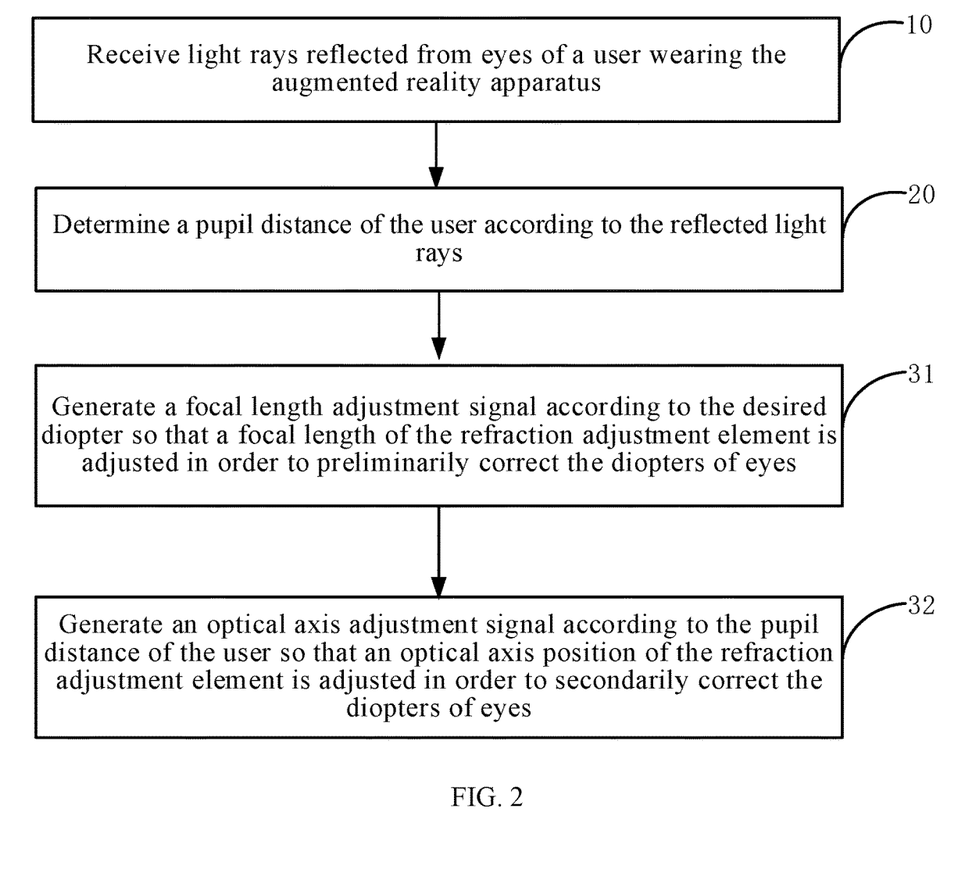
FIG. 2 is a working flowchart of a method for refraction adjustment in an augmented reality apparatus provided by another embodiment of the present disclosure.

In some examples, as shown in FIG. 2, the step of generating a is refraction correction signal according to the pupil distance of the user and a desired diopter(s) for correcting diopters of eyes with a refraction adjustment element comprises:

S31: generating a focal length adjustment signal according to the desired diopter(s) so that the refraction adjustment element may adjust its focal length to preliminarily correct the diopters of eyes; and S32: generating an optical axis adjustment signal according to the pupil distance of the user so that the refraction adjustment element may adjust its optical axis position to secondarily correct the preliminarily corrected diopters of eyes.

The refraction adjustment element may be equivalent to two "equivalent lenses" located in front of eyes. An "equivalent lens" may be a convex lens or a concave lens. When diopters of eyes are corrected, the diopters of the equivalent lenses vary with focal lengths thereof. Correction of the diopters of eyes may be achieved by adjusting the focal lengths of the "equivalent lenses" such that the diopters of the refraction adjustment element reach or approach the desired diopter(s).

In this embodiment, correction of diopters of eyes is finally achieved by two steps. First, the focal length adjustment signal is generated according to the desired diopter(s), and the refraction adjustment element adjusts its focal length(s) according to the focal length adjustment signal so as to preliminarily correct the diopters of eyes. Since the adjustment of the diopters of eyes is associated with not only the focal length of the "equivalent lens" but also the distance between the center of the left eye "equivalent lens" and the center of the right eye "equivalent lens", a good correction effect could be achieved when the distance matches with the to user' pupil distance. The center of the left eye "equivalent lens" is the position of the optical axis of the left eye "equivalent lens" passing through that "equivalent lens". Similarly, the center of the right eye "equivalent lens" is the position of the optical axis of the right eye "equivalent lens" passing through that "equivalent lens". Therefore, an optical axis is adjustment signal is further generated according to the pupil distance of the user. The refraction adjustment element adjusts its optical axis position according to the optical axis adjustment signal, including adjusting the optical axis position of the left eye "equivalent lens" and the optical axis position of the right eye "equivalent lens". By further adjusting the optical axis position, the correction of diopters of eyes by the refraction adjustment element is matched with the pupil distance of the user, thereby achieving a better diopter correction effect for eyes and in turn a better visual effect of images viewed by the left and right eyes of the user wearing the augmented reality apparatus.

The refraction adjustment element may be a liquid crystal lens, a transmissive spatial light modulator (SLM), a liquid lens, an ultrasonic grating, etc. Reference may be made to relevant technologies for approaches for correcting a diopter according to a refraction correction signal by a refraction adjustment element. For example, the refraction adjustment element may be a liquid crystal lens. The liquid crystal lens comprises a liquid crystal layer and electrodes. A liquid crystal molecule in the liquid crystal layer has a birefringence characteristics and a characteristic varied with electric field distribution. The electrodes may be disposed at a plurality of positions of the liquid crystal layer and are used for forming an electric field applied in the liquid crystal layer. A corresponding electric field acting on liquid crystal modules at various positions in the liquid crystal layer may be formed by applying a corresponding voltage to electrodes at various positions, thereby reflective indexes of liquid crystal molecules at respective positions in the liquid crystal layer being correspondingly distributed to achieve an effect of the convex lens that converges light or an effect of the concave lens that diverges light. Thus, the refraction correction signal (including, e.g., the focal length adjustment signal and the optical axis adjustment signal) may be implemented as a corresponding voltage signal applied to the electrodes at different positions. The liquid crystal lens is equivalent to a convex lens is or a concave lens by applying the voltage signal. The focal length and the optical axis position of the "equivalent lens" are determined by the voltage signal. As such, the liquid crystal lens may correct a diopter of an eye.

Figure 3:
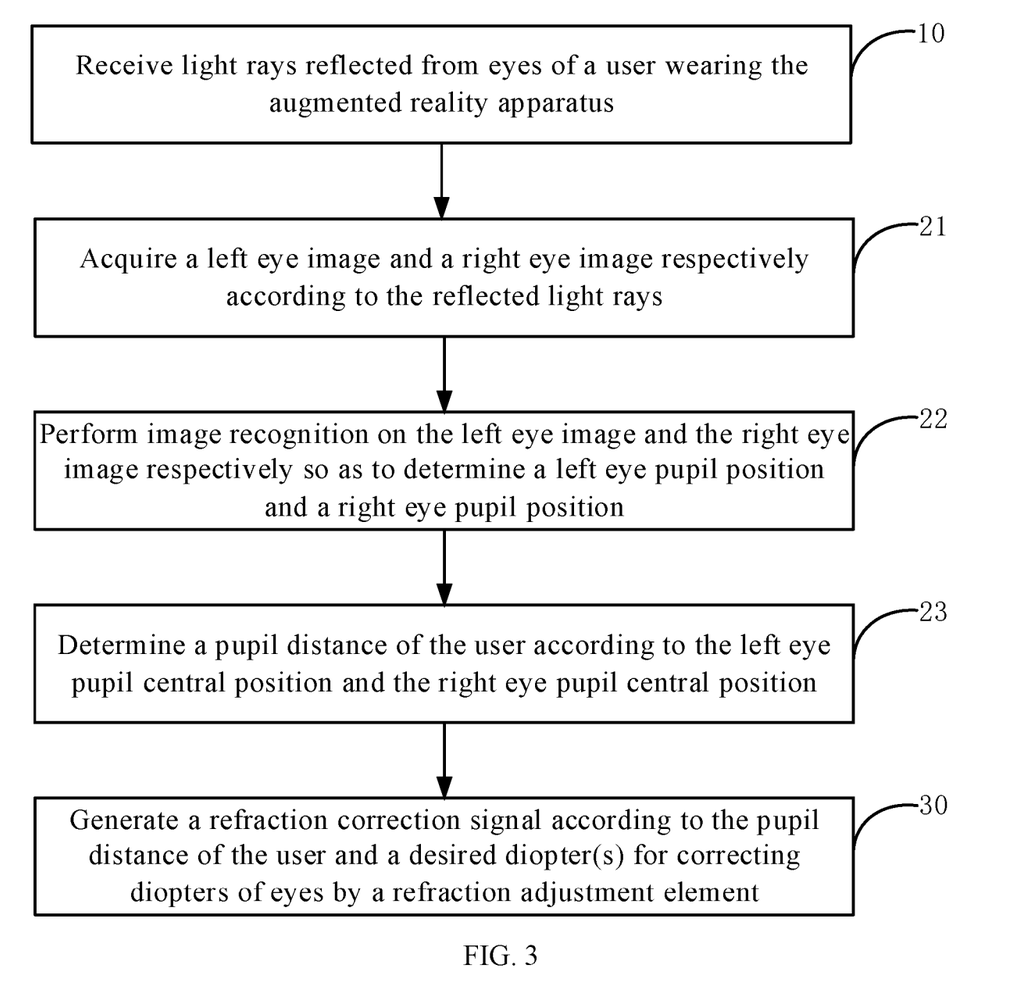
FIG. 3 is a working flowchart of a method for refraction adjustment in an augmented reality apparatus provided by a further embodiment of the present disclosure.

In an optional embodiment, as shown in FIG. 3, the step of determining the pupil distance of the user according to the reflected light rays comprises:

S21: acquiring a left eye image and a right eye image of the user respectively according to the reflected light rays;

S22: performing an image recognition on the left eye image and the right eye image respectively so as to determine a left eye pupil central position and a right eye pupil central position; and S23: determining the pupil distance of the user according to the left eye pupil central position and the right eye pupil central position.

In the embodiment, the left eye image and the right eye image may be acquired according to the reflected light rays. Then, image recognition is performed using an image processing algorithm. For instance, a size and position of a pupil is acquired by acquiring an image feature value of the pupil. Accordingly, the left eye pupil central position is determined according to the left eye image, and the right eye pupil central position is determined according to the right eye image.

The left eye pupil central position and the right eye pupil central position may be relative positions of the pupil centers relative to a fixed point. The fixed point may be a predetermined reference point. The distance between the left eye pupil center and the right eye pupil center, namely the pupil distance of the user, may then be determined according to the pupil central positions.

It can be understood that the pupil distance of the user may be determined in other ways. For instance, the pupil distance of the user may be determined by determining edge positions of the left eye pupil and the right eye pupil that are on the same side.

Figure 4:
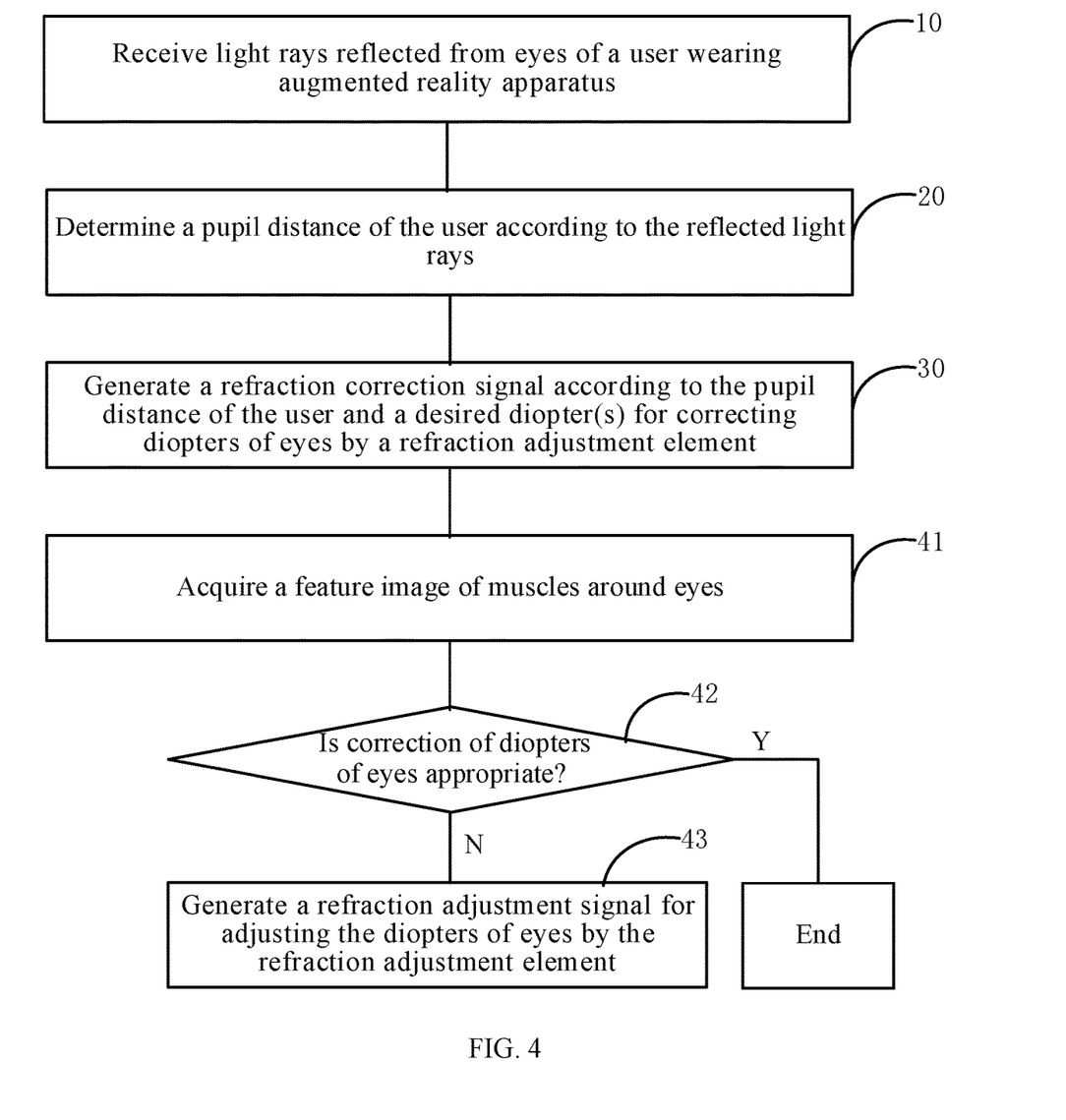
FIG. 4 is a working flowchart of a method for refraction adjustment in an augmented reality apparatus provided by a still further embodiment of the present disclosure.

In an optional embodiment, as shown in FIG. 4, after correcting the is diopters of eyes with the refraction adjustment element, the method according to the embodiment of the present disclosure may further comprise:

S41: acquiring a feature image of muscles around eyes;

S42: determining whether the correction of the diopters of eyes is appropriate according to the image of muscle features; and S43: if no, generating a refraction adjustment signal to adjust the diopters of eyes by the refraction adjustment element; if yes, ending the correction.

After the refraction adjustment element corrects the diopters of eyes, the expected correction effect can usually be achieved, but there may be a certain error on some occasion. As a result, a diopter(s) of the refraction adjustment element may not exactly match with the actually desired diopter. Thus, when the user observes an image through the augmented reality apparatus, the muscles around eyes are inconsistent with those under correctly corrected diopter(s). The muscles around eyes may be largely contracted or expanded. Accordingly, in this embodiment, a feature image of muscles around eyes may be further acquired, and a decision on whether the diopter(s) of eyes is suitably corrected may be made according to the feature image of muscles. Exemplarily, a feature image of muscles around eyes when the user's eyes are viewing normally (that is, in a natural or relaxed state) may be used as a reference image, and the currently acquired feature image of muscles is compared with the reference image to determine whether the muscles around eyes are largely contracted or expanded, that is, to determine whether a diopter correction effect perceived by the user is appropriate. If it is determined that the muscles are largely contracted or expanded, etc., it means the diopter correction effect perceived by the user is inappropriate. At this point, a refraction adjustment signal may be further generated based on, e.g., the extent of muscular contraction or expansion. For instance, the refraction adjustment signal may instruct to increase or decrease the desired diopter(s) by a is certain step size. In a scenario where the refraction adjustment element is implemented by a liquid crystal lens, a voltage applied on the liquid crystal lens may be adjusted according to the refraction adjustment signal so as to fine-tune, e.g., the focal length of the liquid crystal lens. By further fine-tuning the diopters of eyes by the refraction adjustment element according to the refraction adjustment signal, correction of the diopters of eyes may be more suitable.

Figure 5:
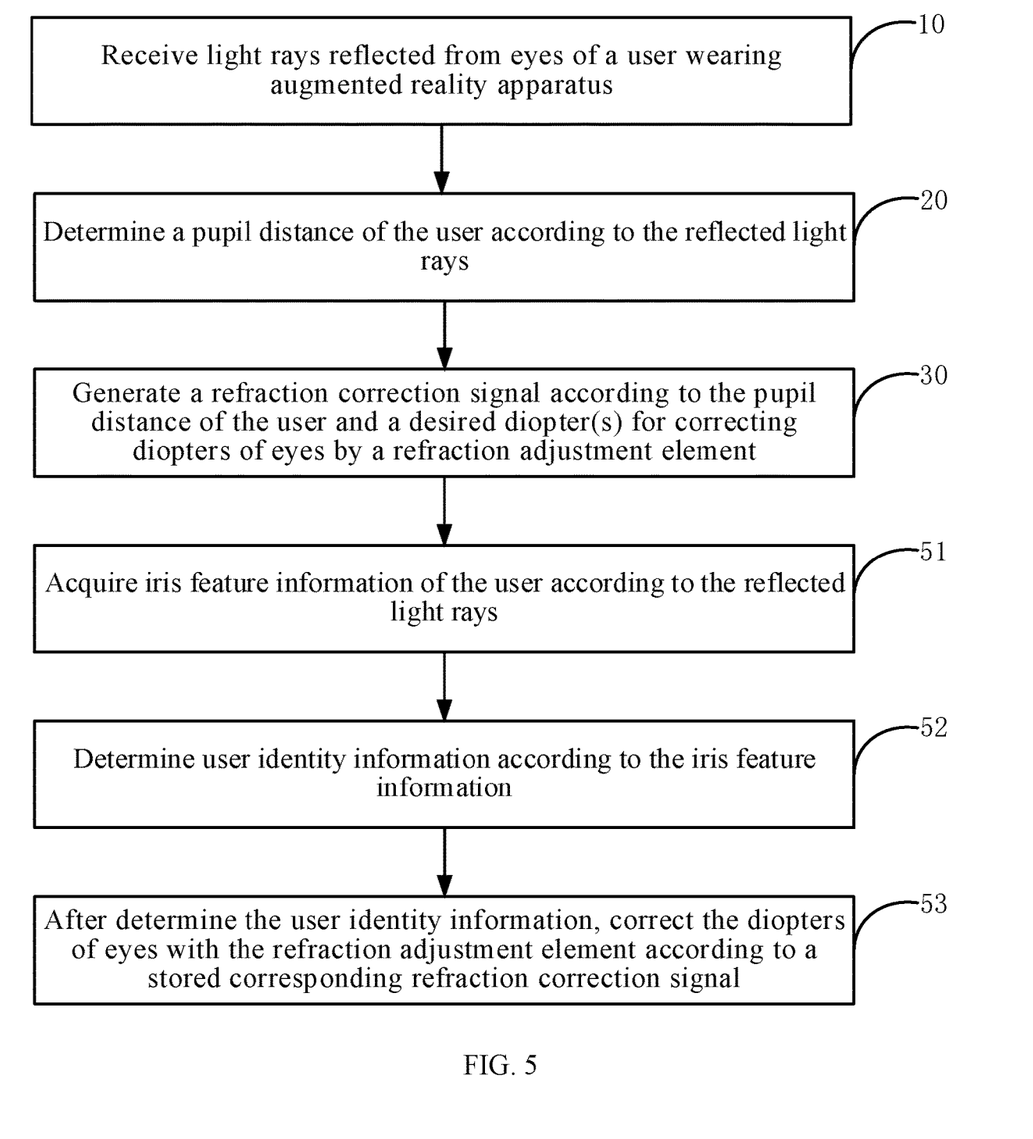
FIG. 5 is a working flowchart of a method for refraction adjustment in an augmented reality apparatus provided by a still further embodiment of the present disclosure.

In some examples, as shown in FIG. 5, the method for refraction adjustment may further comprise:

S51: acquiring iris feature information of the user according to the reflected light rays;

S52: determining user identity information according to the iris feature information; and S53: after determining the user identity information, correcting the diopters of eyes with the refraction adjustment element according to a stored refraction correction signal corresponding thereto.

An iris is located in the middle layer of the eyeball of an eye, in the forefront part of the vascular membrane, and in front of the ciliary body. The iris may adjust the size of the pupil in order to adjust the amount of light entering the eye. The center of the iris is the pupil.

The iris has super uniqueness, that is, everyone has different irises. Therefore, the iris may be used to identify the user identity. Accordingly, in the embodiment, iris feature information of the user may be further acquired according to the reflected light rays. The iris feature information may be information representative of iris features such as the size, color, texture and fiber tissue distribution. User identity information may be determined according to this feature information, and the iris feature information may be pre-stored in correspondence to the user identify information, for example, the correspondence relationship between the iris feature information and the user identity information may be stored. Then, user identity information may be further determined according to acquired is iris feature information. Alternatively or additionally, the iris feature information may be identified by an identifier after being acquired. The identifier represents user identity information.

Optionally, after the refraction correction signal is generated according to the pupil distance of the user and the desired diopter(s), the generated refraction correction signal may be stored in correspondence to the user identity information. For instance, the generated refraction correction signal may be stored in the form of a look-up table, wherein there is a one-to-one correspondence between user identity information and the refraction correction signals. Thus, when the user identity information is determined the next time, diopter correction may be directly done according to a stored refraction correction signal corresponding to the user identity information, without generating a refraction correction signal again. As such, the refraction adjustment element may automatically correct the diopters of eyes, thereby realizing a function of memory storage.

Figure 6:
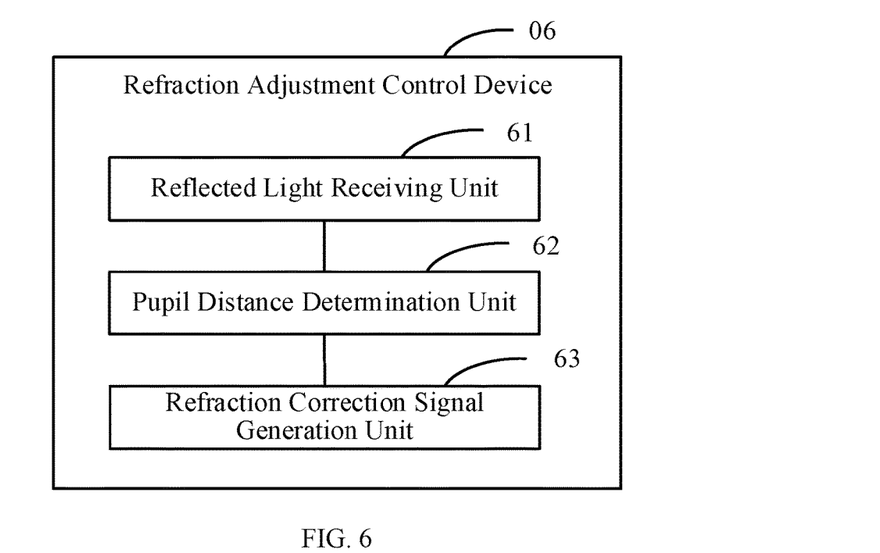
FIG. 6 is a block diagram of a refraction adjustment control device for an augmented reality apparatus provided by an embodiment of the present disclosure.

The embodiment of the present disclosure further provides a refraction adjustment control device for an augmented reality apparatus. As shown in FIG. 6, the refraction adjustment control device 06 comprises:

a reflected light receiving unit 61 configured to receive light rays reflected from eyes of a user wearing the augmented reality apparatus;

a pupil distance determining unit 62 configured to determine a pupil distance of the user according to the reflected light rays; and a refraction correction signal generating unit 63 configured to generate a refraction correction signal according to the pupil distance of the user and a desired diopter(s) for correcting diopters of eyes with a refraction adjustment element.

Corresponding to the embodiments of the above-mentioned method for refraction adjustment, the refraction adjustment control device provided by the present disclosure may satisfy diopter correction requirements of different users and has a good diopter correction effect for is eyes. Moreover, there is no need to wear myopic or hyperopic glasses when an augmented reality apparatus employs the refraction adjustment control device, thereby enhancing the comfort in use of an augmented reality apparatuses.

For embodiments of a device, implementation of functions and effects of elements therein may make reference to implementation of corresponding steps of the above method, which is not reiterated herein.

The device embodiments described above are merely illustrative, wherein elements described as separate components may or may not be physically separated, and the above elements may be combined into one unit, or may be further split into multiple sub-units.

Through the description of the foregoing embodiments, the device in this embodiment may be implemented by means of software, or by means of software plus necessary general hardware, or, of course, may also be implemented by hardware.

In another exemplary embodiment of the present disclosure, there is provided a computer program or a computer program unit, characterized by being suitable to perform on a suitable system (computing device or processor) the method steps of the method according to one of the previous embodiments.

In one embodiment, one or more operations in the described method steps may constitute a computer-readable instruction stored on one or more computer-readable media that, when executed by a computing device, will cause the computing device to perform the described operations.

The embodiment of the present disclosure further provides an augmented reality apparatus comprising a refraction adjustment control device and a refraction adjustment element according to the embodiment of the present disclosure. The refraction adjustment element is disposed at a side close to user's eyes for correcting diopters of eyes according to the refraction correction signal generated by the refraction adjustment control device.

In some embodiments, the augmented reality apparatus further comprises a light source configured to emit light and an optical coupling element configured to couple light rays emitted by the light source to the refraction adjustment element, which light rays are then incident into the field of view range of the user, and reversely couple light rays reflected from the user's eyes to the refraction adjustment control device.

The light source may be of a plurality of types, such as a Light Emitting Diode (LED) or an Organic Light-Emitting Diode (OLED).

The optical coupling element functions to couple light rays emitted by the light source. The light rays emitted by the light source are coupled to the refraction adjustment element through the optical coupling element, and then incident into the field of view range of the user. The eyes may reflect the light rays. The light rays reflected by the eyes pass through the refraction adjustment element, and are reversely coupled to the refraction adjustment control device by the optical coupling element. The refraction adjustment control device may generate the refraction correction signal according to the pupil distance of the user and the desired diopter(s). The refraction correction signal may be transmitted to the refraction adjustment element, which corrects the diopters of eyes according to the refraction correction signal.

An augmented reality apparatus provided by the embodiment of the present disclosure is equipped with a refraction adjustment element, and the refraction adjustment element may correct diopters of eyes according to a pupil distance of the user and a desired diopter(s). The diopter may be corrected adaptively according to diopters of eyes of different users so as to achieve the effect of myopic and hyperopic correction, which satisfies iii diopter correction requirements of different users, and has a good diopter correction effect for eyes. There is no need for a user to wear additional myopic or hyperopic glasses when the augmented reality apparatus is used, thereby enhancing the comfort in use of the augmented reality apparatuses.

It can be understood that all of the possibilities discussed with is reference to FIGS. 1-5 may also be effective to FIG. 6.

Figure 7:
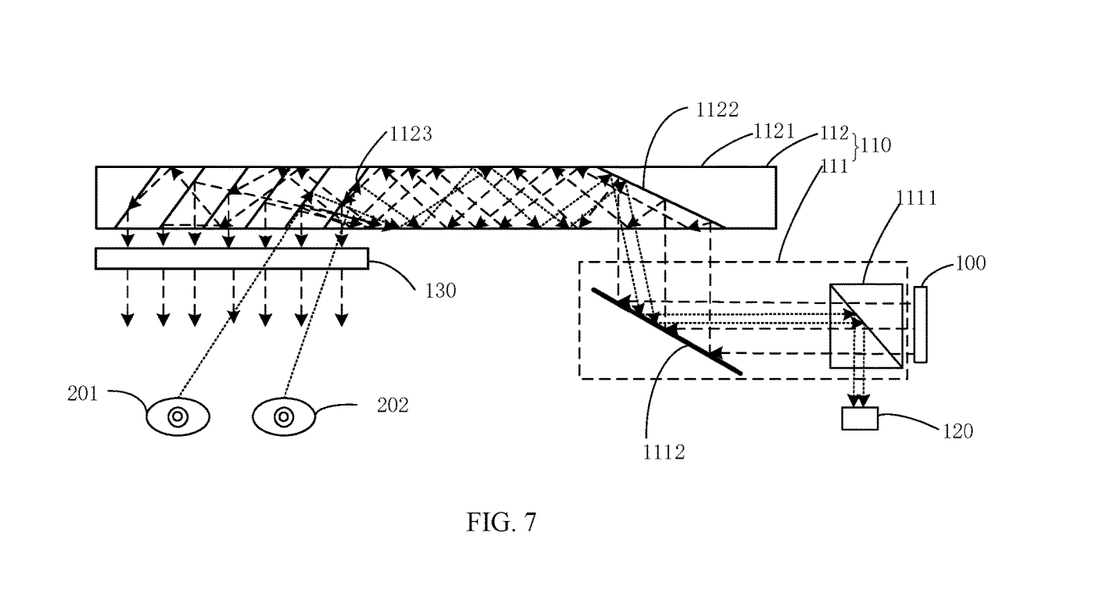
FIG. 7 is a structural schematic view of an augmented reality apparatus provided by an embodiment of the present disclosure.

FIG. 7 is a structural schematic view of an augmented reality apparatus provided by an exemplary embodiment of the present disclosure. The working principle of the augmented reality apparatus will be introduced with reference to FIG. 7.

As shown in FIG. 7, the augmented reality apparatus comprises a light source 100, an optical coupling element 110, a refraction adjustment control device 120 and a refraction adjustment element 130.

The optical coupling element 110 comprises a beam splitting element 111 and an optical waveguide element 112. The beam splitting element 111 is located between the light source 100 and the optical waveguide element 112.

The light rays emitted from the light source 100 are reflected into the optical waveguide element 112 through the beam splitting element 111 and coupled by the optical waveguide element 112 to the refraction adjustment element 130, which light rays are then incident into the field of view range of the two eyes (including the left eye 201 and the right eye 202).

The light rays reflected by two eyes (including the left eye 201 and the right eye 202) of the user are reversely coupled by the optical waveguide element 112 to the beam splitting element 111 and reflected by the beam splitting element 111 to the refraction adjustment control device 120.

The beam splitting element 111 may be an optical prism that may reflect light rays from the light source to make them incident into the optical waveguide element 112.

The optical waveguide element 112 may be a substrate 1121 having two oppositely disposed reflecting surfaces. The substrate 1121 is provided therein with a coupling input prism 1122 and a coupling output prism 1123. The coupling input prism 1122 receives light rays from the beam splitting element 111 and reflects them into the substrate 1121. The light rays are totally reflected multiple times between the two oppositely disposed is reflecting surfaces of the substrate 1121, and then incident into the coupling output prism 1123. The coupling output prism 1123 reflects the light rays out of the substrate. The light rays are again incident into the refraction adjustment element 130, and then pass through the refraction adjustment element 130. After that, the light rays are incident into the field of view range of the user.

The light rays reflected from the user's eyes pass through the refraction adjustment element 130 and then may be reversely coupled to the refraction adjustment control device 120 through the optical waveguide element 110. Exemplarily, the light rays are incident from the refraction adjustment element 130 into the coupling output prism 1123, and after being reflected thereby, the light rays are totally reflected multiple times between the two oppositely disposed reflecting surfaces of the substrate 1121, and then incident into the coupling input prism 1122. The coupling input prism 1122 reflects the light rays out of the substrate. The light rays are again incident into the refraction adjustment control device 120.

It can be understood that the optical coupling element is not limited to the structure shown in the drawings, and may be other types of optical elements. In some embodiments, the refraction adjustment control device may, e.g., determine a pupil distance and/or generate a refraction correction signal by means of a microprocessor having data calculating or processing capability.

In some examples, as shown in FIG. 7, the beam splitting element 111 comprises a beam splitting prism 1111 and a dichroic mirror 1112. The beam splitting prism 1111 is located between the light source 100 and the dichroic mirror 1112, and the dichroic mirror 1112 is located between the iii beam splitting prism 1111 and the optical waveguide element 112.

The light rays emitted from the light source 100 is incident into the dichroic mirror 1112 through the beam splitting prism 1111 and is reflected by the dichroic mirror 1112 to the optical waveguide element 112.

The light rays reflected from the user's eyes are reversely coupled to is the dichroic mirror 1112 through the optical waveguide element 112. After being reflected to the beam splitting prism 1111 through the dichroic mirror 1112, the light rays may be reflected to the refraction adjustment control device 120 through the beam splitting prism 1111.

The beam splitting element in this embodiment comprises a beam splitting prism and a dichroic mirror. Light rays emitted from a light source may be directly incident into the dichroic mirror through the beam splitting prism. After exiting from the optical waveguide element, the light rays reflected from the user's eyes are reflected to the beam splitting prism through the dichroic mirror, and enter into the refraction adjustment control device after being reflected by the beam splitting prism. Accordingly, the beam splitting element splits the light rays emitted from the light source and the light rays reflected from the user's eyes, such that the refraction adjustment control device may receive the light rays reflected by the user's eyes so as to generate the refraction correction signal according to the reflected light rays, thereby correcting the diopters of eyes by the refraction adjustment element.

The beam splitting prism may be two oppositely disposed triangular prisms as shown in the drawing. The opposite surfaces of the two triangular prisms constitute beam splitting reflective surfaces to achieve a beam splitting effect. Of course, the beam splitting prism may also be composed of other lenses or prisms, which are not limited to the structures shown in the drawing.

Figure 8:
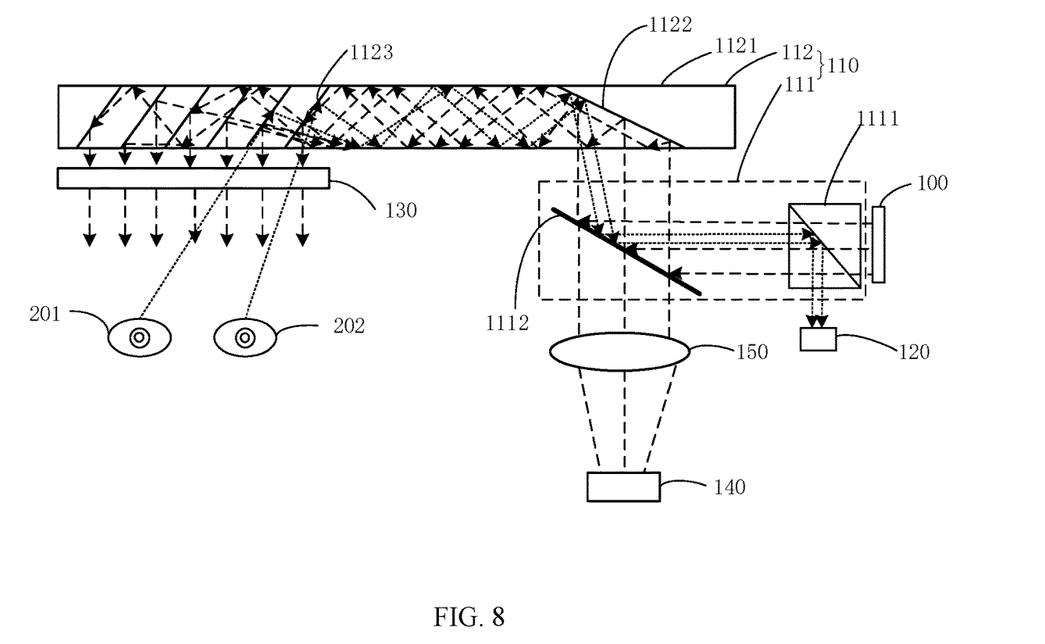
FIG. 8 is a structural schematic view of an augmented reality apparatus provided by another embodiment of the present disclosure.

In an optional embodiment, as shown in FIG. 8, the augmented reality apparatus may further comprise a microdisplay element 140 and a collimating element 150.

The microdisplay element 140 may be configured to display an image. A wavelength of light rays of the displayed image is different from a wavelength of light rays emitted by the light source 100.

The collimating element 150 may be located between the microdisplay element 140 and the dichroic mirror 1112. The dichroic is mirror 1112 is located between the collimating element 150 and the optical waveguide element 112.

The light rays of the displayed image are collimated through the collimating element 150 and then incident into the optical waveguide element 112 after directly passing through the dichroic mirror 1112. After that, the light rays are coupled to the refraction adjustment element 130 through the optical waveguide element 112, and then incident into the field of view range of the user.

The microdisplay element 140 may be a liquid crystal display panel or an organic light emitting diode display panel for displaying an image. The wavelength of light rays of the displayed image is different from the wavelength of light rays emitted by the light source. The wavelength of the light rays of the image is that of visible light, which usually ranges from 380 nm to 780 nm. The light source may be an infrared source that may emit infrared light. The wavelength of the infrared light is longer than that of visible light, which wavelength usually ranges from 770 nm to 1 mm.

Since the wavelength of the light rays of the image is different from the wavelength of the light rays emitted by the light source, the dichroic mirror may have a function of beam splitting. The light rays of the displayed image may directly pass through the dichroic mirror, while the light rays of the light source reflected from the user's eyes are reflected to the beam splitting prism through the dichroic mirror. After that, the light rays are incident into the refraction adjustment control device through the beam splitting prism. Since the dichroic mirror splits the light rays of the image and the light rays emitted from the light source, these two kinds of light rays do not interfere with each other and are respectively incident into respective elements.

The light rays of the image are collimated into parallel light by the collimating element, and then incident into the dichroic mirror, which parallel light enters the optical waveguide element after directly passing through the dichroic mirror. After that, the parallel light is coupled to the is refraction adjustment element through the optical waveguide element and then incident into the field of view range of the user. As such, the image may be observed by the user's eyes. The image is merged as a virtual image with objects in the real environment actually observed by eyes to achieve an augmented reality effect.

In order to allow eyes to observe a complete image displayed by the microdisplay element, and provide the eyes with a certain movable space, the coupling output element may be a laminated prism including a plurality of reflecting prisms. Light rays are reflected or refracted by the laminated prism and then incident into the two eyes, thereby achieving exit pupil expansion.

The collimating element may be a convex lens or other optical element composed of combined lenses. The dichroic mirror may be a reflecting prism having a reflecting surface or the like.

Various embodiments of the present disclosure may be used individually, in combination or in various arrangements not specifically discussed in the embodiments described above, so its application is not limited to the details and arrangements of the components described in the above description or illustrated in the drawings. For example, some features described in one embodiment may be combined in any way with some features described in other embodiments.

Moreover, the word "exemplary" is used herein to mean serving as an example, instance or illustration, but not necessarily to be construed as advantageous. As used in this application, the term "or" is intended to mean an exclusive "or" rather than an inclusive "or." In addition, unless otherwise specified or clearly from the context to be directed to a singular form, "a" and "an" as used in this application are generally interpreted as meaning "one or more". In addition, at least one of A and B and/or similar expression generally means either A or B or both A and B. Furthermore, to the extent that the terms "includes", "having", "has", "with", and/or variants thereof are used in either the detailed description or the claims, is such terms are intended to be inclusive in a manner similar to the term "comprising."

After considering the specification and practicing the disclosure herein, those skilled in the art will easily conceive of other embodiments of the present disclosure. The present disclosure is intended to cover any variation, use or adaptation of the present disclosure that follow the general principles of the present disclosure and include common knowledge or conventional technical means in the technical field not disclosed in the present disclosure. The specification and examples are considered to be exemplary only, and the true scope and spirit of the present disclosure are indicated by the claims.

The invention claimed is:

1. A method for refraction adjustment in an augmented reality apparatus, comprising:
   receiving light rays reflected from eyes of a user wearing the augmented reality apparatus;
   determining a pupil distance of the user according to reflected light rays; and
   generating a refraction correction signal according to the pupil distance of the user and a desired diopter(s) for correcting diopters of the user's eyes by a refraction adjustment element in the augmented reality apparatus;
   wherein, after correcting the diopters of the user's eyes by the refraction adjustment element, the method further comprises:
   acquiring a feature image of muscles around eyes; and
   generating a refraction adjustment signal, in response to correction of the diopters of eyes being determined as inappropriate according to the feature image of muscles, for adjusting the diopters of eyes by the refraction adjustment element.

2. The method according to claim 1, wherein said generating a refraction correction signal according to the pupil distance of the user and a desired diopter(s) for correcting diopters of eyes by the refraction adjustment element comprises:
   generating a focal length adjustment signal according to the desired diopter(s) for adjusting by the refraction adjustment element its focal length so as to preliminarily correct the diopters of eyes; and
   generating an optical axis adjustment signal according to the pupil distance of the user for adjusting by the refraction adjustment element its optical axis position so as to secondarily correct the diopters of eyes.

3. The method according to claim 1, wherein said determining a pupil distance of the user according to the reflected light rays comprises:
   acquiring a left eye image and a right eye image of the user respectively according to the reflected light rays;
   performing image recognition on the left eye image and the right eye image respectively so as to determine a left eye pupil position and a right eye pupil position; and
   determining the pupil distance of the user according to the left eye pupil position and the right eye pupil position.

4. The method according to claim 1, further comprising: storing the refraction correction signal generated for the user in correspondence to identity information of the user.

5. The method according to claim 4, further comprising:
   acquiring iris feature information of eyes according to the reflected light rays;
   determining the identity information of the user according to the iris feature information of eyes;
   acquiring a stored corresponding refraction correction signal based on determined identity information; and
   correcting the diopters of eyes by the refraction adjustment element according to an acquired corresponding refraction correction signal.

6. An augmented reality apparatus, comprising:
   a refraction adjustment controller configured to receive light rays reflected from eyes of a user wearing the augmented reality apparatus, determine a pupil distance of the user according to reflected light rays and generate a refraction correction signal according to the pupil distance of the user and a desired diopter(s); and
   a refraction adjustment element being at a side close to the user's eyes and configured to correct the diopters of the user's eyes according to the refraction correction signal generated by the refraction adjustment controller;
   wherein said refraction adjustment controller is further configured to acquire a feature image of muscles around eyes; and generate a refraction adjustment signal, in response to correction of the diopters of eyes being determined as inappropriate according to the feature image of muscles, for adjusting the diopters of eyes by the refraction adjustment element.

7. The augmented reality apparatus according to claim 6, further comprising:
   a light source configured to emit light rays; and
   an optical coupling element configured to couple the light rays emitted by the light source to the refraction adjustment element before the light rays are incident into a field of view range of the user, and reversely couple the light rays reflected from the user's eyes to the refraction adjustment control device.

8. The augmented reality apparatus according to claim 7, wherein
   the optical coupling element comprises a beam splitting element and an optical waveguide element, the beam splitting element being between the light source and the optical waveguide element;
   the light rays emitted from the light source are reflected to the optical waveguide element through the beam splitting element, coupled by the optical waveguide element to the refraction adjustment element and then incident into a field of view range of the user; and
   the light rays reflected from the user's eyes are reversely coupled by the optical waveguide element to the beam splitting element after they pass through the refraction adjustment element, and are then reflected by the beam splitting element to the refraction adjustment control device.

9. The augmented reality apparatus according to claim 8, wherein
   the beam splitting element comprises a beam splitting prism and a dichroic mirror;
   the beam splitting prism is between the light source and the dichroic mirror, and the dichroic mirror is between the beam splitting prism and the optical waveguide element;
   the light rays emitted from the light source are incident into the dichroic mirror through the beam splitting prism and are reflected to the optical waveguide element by the dichroic mirror; and the light rays reflected from the user's eyes are reversely coupled to the dichroic mirror through the optical waveguide element, reflected to the beam splitting prism by the dichroic mirror, and then reflected to the refraction adjustment control device by the beam splitting prism.

10. The augmented reality apparatus according to claim 9, further comprising:

a microdisplay element configured to display an image to the user, and a wavelength of light rays of a displayed image being different from a wavelength of the light rays emitted by the light source; and a collimating element being between the microdisplay element and the dichroic mirror, the dichroic mirror being between the collimating element and the optical waveguide element;

wherein the light rays of the displayed image are incident into the optical waveguide element through the dichroic mirror after being collimated by the collimating element, and are coupled to the refraction adjustment element through the optical waveguide element before incident into a field of view range of the user.

11. The augmented reality apparatus according to claim 8, wherein said optical waveguide element comprises a substrate having two opposite reflecting surfaces, and said substrate comprises a coupling input prism and a coupling output prism;

wherein said coupling input prism is configured to receive light rays from the beam splitting element, and said coupling output prism is configured to reflect the light rays out of the substrate.

12. The augmented reality apparatus according to claim 6, wherein said refraction adjustment controller is configured to generate a focal length adjustment signal according to the desired diopter(s) for adjusting by the refraction adjustment element its focal length so as to preliminarily correct the diopters of eyes, and generate an optical axis adjustment signal according to the pupil distance of the user for adjusting by the refraction adjustment element its optical axis position so as to secondarily correct the diopters of eyes .

13. The augmented reality apparatus according to claim 6, wherein said refraction adjustment controller is configured to: acquire a left eye image and a right eye image of the user respectively according to the reflected light rays, perform image recognition on the left eye image and the right eye image respectively so as to determine a left eye pupil position and a right eye pupil position, and determine the pupil distance of the user according to the left eye pupil position and the right eye pupil position.

14. The augmented reality apparatus according to claim 6, wherein said refraction adjustment controller is further configured to store the refraction correction signal generated for the user in correspondence to identity information of the user.

15. The augmented reality apparatus according to claim 14, wherein said refraction adjustment controller is further configured to acquire iris feature information of eyes according to the reflected light rays, determine the identity information of the user according to the iris feature information of eyes, acquire a stored corresponding refraction correction signal based on determined identity information, and correct the diopters of eyes by the refraction adjustment element according to an acquired corresponding refraction correction signal.

* * * * *